Nov. 8, 1960  G. H. COOK  2,959,103
OPTICAL OBJECTIVES
Filed April 4, 1958
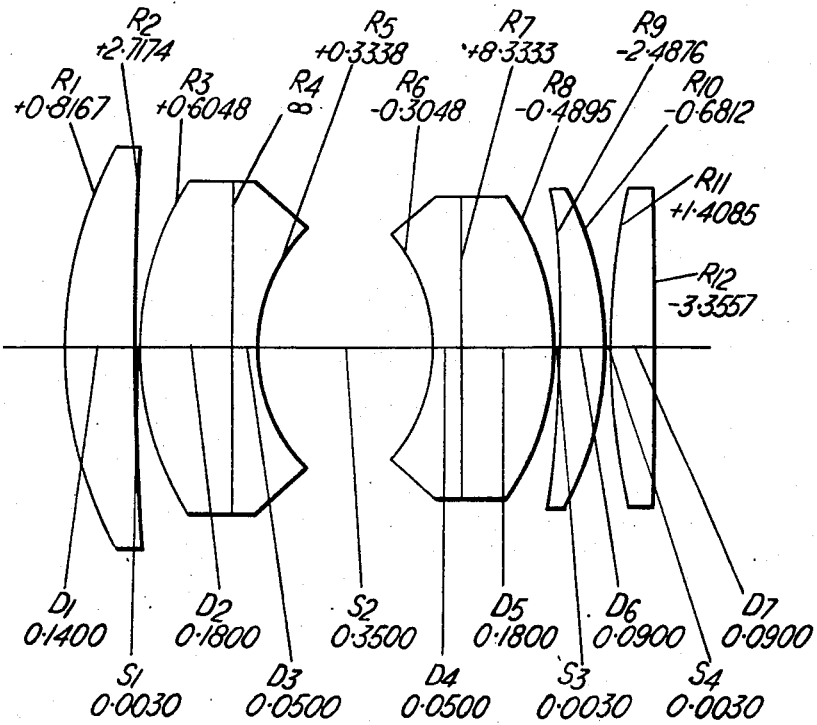

United States Patent Office 2,959,103
Patented Nov. 8, 1960

2,959,103

OPTICAL OBJECTIVES

Gordon Henry Cook, Leicester, England, assignor to Taylor, Taylor & Hobson Limited, Leicester, England, a British company Filed Apr. 4, 1958, Ser. No. 726,505

Claims priority, application Great Britain Apr. 9, 1957

17 Claims. (Cl. 88—57)

This invention relates to an optical objective, more especially though not exclusively for photographic purposes, of the kind corrected for spherical and chromatic aberrations, coma, astigmatism, field curvature and distortion, and comprising two compound meniscus components having their air-exposed surfaces concave to a diaphragm between them and disposed between simple collective components. Objectives of this kind having four components have been known for a long time and have been developed to give a high degree of correction for all the primary aberrations. Various modifications of the four-component objective of this kind have been proposed, often involving five or more components instead of four, in order to give correction also for higher order aberrations. With these modified objectives good correction both for primary and higher order aberrations can be achieved with a wide relative aperture and a small or moderate back focal distance. When a long back focal distance is required, adequate correction has hitherto only been maintained at the expense of a reduced relative aperture.

The present applicant's copending United States of America patent application Serial No. 700,145 is concerned with a five component objective of the above described kind having a moderate back focal distance and wherein a high degree of correction both for zonal spherical aberration and for the oblique aberrations is obtained over a wide angle of view for a medium relative aperture, say between F/1.8 and F/3.0, whilst also a high degree of correction for the primary aberrations is maintained. In such objective, the numerical sum of the radii of curvature of the rear surface of the front compound meniscus component and the front surface of the rear compound meniscus component lies between 1.33 and 2.33 times the axial length of the air space between such surfaces, whilst the axial thickness of the front compound meniscus component lies between 0.1 F and 0.16 F and the axial thickness of the rear compound meniscus component lies between 0.08 F and 0.14 F, where F is the equivalent focal length of the whole objective.

The present invention has for its object to provide an improved optical objective of the above-described general kind, which, in contrast with the objective, subject of the above-mentioned copending application, has a long back focal distance, such objective at the same time having a high degree of correction both for primary and higher order aberrations, especially zonal spherical aberration, for a wide relative aperture, say of the order of F/1.4.

The objective according to the present invention comprises two compound meniscus components having their air-exposed surfaces concave to a diaphragm between them, a simple collective component to the front of such compound components, and two simple collective components to the rear of such compound components, the numerical sum of the radii of curvature of the rear surface of the front compound meniscus component and the front surface of the rear compound meniscus component lying between 1.33 and 2.33 times the axial length of the air space between such surfaces whilst the sum of the equivalent powers of the two compound meniscus components lies between $-0.7/F$ and $-1.1/F$, where F is the equivalent focal length of the whole objective, the power of the rear surface of the rear compound meniscus component lying between 2 and 7 times the reciprocal of the sum of the equivalent focal lengths of the two simple collective rear components. In such objective, the strong curvatures of the rear surface of the front compound meniscus component and of the front surface of the rear compound meniscus component, in relation to the axial air space between such surfaces, together with the high power of the rear surface of the rear compound meniscus component, in relation to the sum of the equivalent focal lengths of the two simple collective rear components, are important in achieving good aberration correction, the latter feature being especially important for the correction of zonal spherical aberration, whilst the equivalent powers of the two compound meniscus components are important in achieving a long back focal distance without loss of aberration correction.

It is to be understood that the terms "front" and "rear" are used herein in their usual significance to refer to the sides of the objective respectively nearer to and further from the longer conjugate, so that when the objective is used for photographic purposes, the light passes through the objective from the front to the rear.

It is also to be understood that the power of a surface is the quantity defined mathematically by the expression $(n^1-n)/R$, where $n$ and $n^1$ are the mean refractive indices of the materials respectively in front of and behind the surface, and R is the radius of curvature of the surface regarded as positive if the surface is convex to the front and negative if the surface is concave to the front, the power being collective or dispersive in accordance with whether such mathematical expression is positive or negative.

Features of the simple collective front component and the simple collective fourth component are also important to a lesser extent in the achievement of a long back focal distance without loss of aberration correction. Thus, the rear surface of the simple collective front component is preferably convex to the front and has a radius of curvature lying between 0.75 and 2.25 times the equivalent focal length of such component, such equivalent focal length lying between 1.5 F and 2.0 F, whilst the front surface of the simple collective fourth component is concave to the front and has a radius of curvature lying between F and 4 F.

In general, assistance in the achievement of a long back focal distance is obtained by reducing power at the front of the objective as far as is possible without substantial loss of aberration correction. Preferably, the combined equivalent power of the front two components lies between $0.2/F$ and $0.45/F$ whilst the combined equivalent power of the front three components lies between $-0.2/F$ and $+0.2/F$.

The compound meniscus components are preferably constituted by doublets. In this case, for assisting to maintain correction for chromatic aberrations with a long back focal distance, the arithmetic mean of the values of the Abbé V numbers of the materials of the front two elements of the objective is preferably greater than the Abbé V number of the material of the third element and less than the arithmetic mean of the values of the Abbé V numbers of the materials of the rear three elements.

Again, when the compound meniscus components are constituted by doublets, the refractive indices of the materials of the elements of such components are preferably such as to assist in the correction of oblique aberrations. Thus, the mean refractive index of the material of the rear element of the front compound meniscus component is preferably less than the mean of the mean refractive indices of the materials of the front element of such compound meniscus components. Further, the mean refractive indices of the materials of the front meniscus doublet component preferably differ from one another by an amount lying between 0.02 and 0.09 whilst those of the materials of the rear meniscus doublet component differ from one another by an amount less than 0.04, the radius of curvature of the internal contact surface of each such component being numerically greater than 2 F. It will thus be appreciated that each of such internal contact surfaces may be either convex or concave to the front.

The axial thicknesses of the two compound meniscus components, whether or not such components are doublets, preferably each lie between 0.18 F and 0.28 F.

Preferably, the equivalent focal length of the simple collective fourth component lies between 0.5 and 1.5 times the equivalent focal length of the simple collective rear component, the sum of such equivalent focal lengths lying between 1.3 F and 4.5 F.

The rear surface of the simple collective component is preferably concave to the front with radius of curvature lying between 0.4 F and F, whilst the front and rear surfaces of the simple collective rear component are preferably respectively convex and concave to the front with radii of curvature respectively lying between 0.75 F and 2.5 F and between 1.75 F and 6.0 F.

The power of the front surface of the front compound meniscus component conveniently lies between 1.5 and 2.5 times the equivalent power of the simple collective front component, and the radius of curvature of the rear surface of the rear compound meniscus component preferably lies between 0.33 F and 0.66 F.

Numerical data for a convenient practical example of objective according to the invention are given in the following table, in which $R_1, R_2$ ... represent the radii of curvature of the individual surfaces (the positive sign indicating that the surface is convex to the front and the negative sign that it is concave thereto), $D_1, D_2$ ... represent the axial thicknesses of the elements, and $S_1, S_2$ ... represent the axial air separations between components. The table also gives the mean refractive indices $n_d$ for the d-line and the Abbé V numbers of the materials used for the elements of the objective.

The insertion of equals (=) signs in the radius columns of the tables, in company with plus (+) and minus (—) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

[Equivalent focal length 1.000. Relative aperture F/1.4]

| Radius | Thickness or Air Separation | Refractive Index $n_d$ | Abbe V Number |
| --- | --- | --- | --- |
| $R_1 = +0.8167$ | $D_1 = 0.1400$ | 1.6479 | 33.80 |
| $R_2 = +2.7174$ | $S_1 = 0.0030$ | | |
| $R_3 = +0.6048$ | $D_2 = 0.1800$ | 1.6968 | 55.61 |
| $R_4 = \infty$ | $D_3 = 0.0500$ | 1.6479 | 33.80 |
| $R_5 = +0.3338$ | $S_2 = 0.3500$ | | |
| $R_6 = -0.3048$ | $D_4 = 0.0500$ | 1.7003 | 30.28 |
| $R_7 = +8.3333$ | $D_5 = 0.1800$ | 1.6968 | 55.61 |
| $R_8 = -0.4895$ | $S_3 = 0.0030$ | | |
| $R_9 = -2.4876$ | $D_6 = 0.0900$ | 1.6510 | 58.60 |
| $R_{10} = -0.6812$ | $S_4 = 0.0030$ | | |
| $R_{11} = +1.4085$ | $D_7 = 0.0900$ | 1.6510 | 58.60 |
| $R_{12} = -3.3557$ | | | |

In this example, the objective is corrected over a semi-angular field of 17½ degrees with respect to a diaphragm located substantially in the middle of the air space $S_2$, and has a long back focal distance of 0.7303 F.

The numerical sum of the radii of the surfaces $R_5$ and $R_6$ is 0.638 F, which is 1.82 times the axial air space $S_2$. These two radii are small in an objective having a relative aperture as high as F/1.4, so that the axial air space $S_2$ is also relatively small, this being important in the achievement of good aberration correction. The equivalent focal lengths of the simple collective fourth and fifth components are respectively 1.413 F and 1.535 F, the optical power of the surface $R_8$ being 1.423/F, which is 4.20 times the reciprocal of the sum of such equivalent focal lengths. This high optical power of the surface $R_8$ is important in the achievement of good correction for zonal spherical aberration. The equivalent powers of the compound meniscus components are especially important in the achievement of a long back focal distance without sacrifice of aberration correction. Thus, in the example, the equivalent focal lengths of the front and rear compound meniscus components are respectively 2.066 F and 2.318 F, both such components being dispersive doublets, so that the sum of the equivalent powers of such two components is numerically 0.930/F.

The curvature of the surface $R_2$, especially in relation to the equivalent focal length of the simple collective front component, and also the curvature of the surface $R_9$, are also important to a lesser extent in the achievement of a long back focal distance. In the example the equivalent focal length of the simple collective front component is 1.751 F, the radius of the surface $R_2$ being 1.546 times such equivalent focal length.

The combined equivalent power of the front two components in the example is +0.272/F whilst the combined equivalent power of the front three components is —0.045/F. The very low value of the latter sum especially is important for assisting in the achievement of a long back focal distance.

To further assist in the correction of zonal spherical aberration, and also astigmatism, the surface $R_3$ also has high optical power. In the example the power of the surface $R_3$ is 1.150/F, which is 2.01 times the equivalent focal length of the simple collective front component.

The Abbé V numbers of the seven elements of the objective are important for maintaining correction for chromatic aberrations with a long back focal distance. In the example, the arithmetic mean of the values of the Abbé V numbers of the materials of the front two elements is 44.7, which is greater than the Abbé V number of the material of the third element, 33.8, and less than the arithmetic mean of the values of the Abbé V numbers of the materials of the rear three elements, which is 57.6.

The refractive indices of the materials of the elements of the two compound meniscus components are such as to assist especially in the correction of oblique aberrations. In the example, the mean refractive indices of the materials of the front doublet component differ by 0.049 and those of the rear doublet component by 0.0035. The mean of the mean refractive indices of the materials of the front elements of such components is 1.6986, which exceeds the refractive index of the material of the rear element of the front doublet component by 0.0507.

The axial thicknesses of the two compound meniscus components are made as small as possible consistent with providing practicable edge thicknesses of the convergent elements and axial thicknesses of the divergent elements of such components. In the example the axial thicknesses of the front and rear doublet components are each 0.230 F.

The two surfaces $R_3$ and $R_8$ are arranged to have clear diameters bearing such relation to the diameters of the other surfaces of the objective that these two clear diameters act as limiting apertures for oblique pencils. In the example the clear diameters of the five components, reading from the front to the rear, are respectively 0.793 F, 0.650 F, 0.601 F, 0.625 F and 0.625 F, whilst the chamfer diameters of the surfaces $R_5$ and $R_6$ are respectively 0.469 F and 0.444 F. Vignetting is thus significantly reduced without loss of aberration correction.

What I claim as my invention and desire to secure by Letters Patent is:

1. An optical objective corrected for spherical and chromatic aberrations, coma, astigmatism, field curvature and distortion comprising two doublet meniscus components having their air exposed surfaces concave to a diaphragm between them, a simple collective component in front of such doublet components and two simple collective components behind such doublet components, the mean refractive index of the material of the rear element of the front doublet meniscus component being less than that of the front element of such component by an amount lying between 0.02 and 0.09 and the numerical sum of the radii of curvature of the rear surface of the front doublet meniscus component and the front surface of the rear doublet meniscus component lying between 1.33 and 2.33 times the axial length of the air space between such surfaces while the power of the rear surface of the rear doublet meniscus component lies between 2 and 7 times the reciprocal of the sum of the equivalent focal lengths of the two simple collective rear components, the sum of the equivalent powers of the two doublet meniscus components lying between $-0.7/F$ and $-1.1/F$ and the equivalent focal length of the simple collective front component lying between 1.5 F and 2.0 F, where F is the equivalent focal length of the whole objective, while the combined equivalent power of the front two components lies between $0.2/F$ and $0.45/F$ and the combined equivalent power of the front three components lies between $-0.2/F$ and $0.2/F$.

2. An optical objective as claimed in claim 1, in which the rear surface of the simple collective front component is convex to the front and has a radius of curvature lying between 0.75 and 2.25 times the equivalent focal length of such component, the front surface of the simple collective fourth component being concave to the front with a radius of curvature lying between F and 4 F.

3. An optical objective as claimed in claim 1 in which the mean refractive indices of the materials of the rear doublet meniscus component differ from one another by an amount less than 0.04, the radius of curvature of the internal contact surface of each doublet component being numerically greater than 2 F.

4. An optical objective as claimed in claim 1, in which the arithmetic mean of the values of the Abbé V numbers of the materials of the front two elements of the objective being greater than the Abbé V number of the material of the third element and less than the arithmetic mean of the values of the Abbé V numbers of the materials of the rear three elements.

5. An optical objective as claimed in claim 2, in which the equivalent focal length of the simple collective fourth component lies between 0.5 and 1.5 times the equivalent focal length of the simple collective rear component, the sum of such equivalent focal lengths lying between 1.33 F and 4.5 F.

6. An optical objective as claimed in claim 2, in which the rear surface of the simple collective fourth component is concave to the front and has a radius of curvature lying between 0.4 F and F, whilst the front and rear surfaces of the simple collective rear component are respectively convex and concave to the front and have radii of curvature respectively lying between 0.75 F and 2.5 F and between 1.75 F and 6.0 F.

7. An optical objective as claimed in claim 2, in which the power of the front surface of the front doublet meniscus component lies between 1.5 and 2.5 times the equivalent power of the simple collective front component.

8. An optical objective as claimed in claim 1, in which the mean refractive index of the material of the rear element of the front doublet meniscus component is less than the mean of the mean refractive indices of the materials of the front elements of such doublet meniscus components.

9. An optical objective as claimed in claim 8 in which the mean refractive indices of the materials of the rear doublet meniscus component differ from one another by an amount less than 0.04, the radius of curvature of the internal contact surface of each doublet component being numerically greater than 2 F.

10. An optical objective as claimed in claim 1, in which the equivalent focal length of the simple collective fourth component lies between 0.5 and 1.5 times the equivalent focal length of the simple collective rear component, the sum of such equivalent focal lengths lying between 1.33 F and 4.5 F.

11. An optical objective as claimed in claim 1, in which the rear surface of the simple collective fourth component is concave to the front and has a radius of curvature lying between 0.4 F and F, whilst the front and rear surfaces of the simple collective rear component are respectively convex and concave to the front and have radii of curvature respectively lying between 0.75 F and 2.5 F and between 1.75 F and 6.0 F.

12. An optical objective as claimed in claim 1, in which the power of the front surface of the front doublet meniscus component lies between 1.5 and 2.5 times the equivalent power of the simple collective front component.

13. An optical objective as claimed in claim 12, in which the radius of curvature of the rear surface of the rear doublet meniscus component lies between 0.33 F and 0.66 F.

14. An optical objective as claimed in claim 1, in which the radius of curvature of the rear surface of the rear doublet meniscus component lies between 0.33 F and 0.66 F.

15. An optical objective as claimed in claim 1, in which the axial thicknesses of the two doublet meniscus components each lie between 0.18 F and 0.28 F.

16. An optical objective as claimed in claim 4, in which the mean refractive index of the material of the rear element of the front compound meniscus component is less than the mean of the mean refractive indices of the materials of the front elements of such compound meniscus components.

17. An optical objective substantially in accordance with the following table:

[Equivalent focal length 1.000. Relative aperture F/1.4]

| Radius | Thickness or Air Separation | Refractive Index $n_d$ | Abbé V Number |
|---|---|---|---|
| $R_1 = +0.8167$ | | | |
| | $D_1 = 0.1400$ | 1.6479 | 33.80 |
| $R_2 = +2.7174$ | | | |
| | $S_1 = 0.0030$ | | |
| $R_3 = +0.6048$ | | | |
| | $D_2 = 0.1800$ | 1.6968 | 55.61 |
| $R_4 = \infty$ | | | |
| | $D_3 = 0.0500$ | 1.6479 | 33.80 |
| $R_5 = +0.3338$ | | | |
| | $S_2 = 0.3500$ | | |
| $R_6 = -0.3048$ | | | |
| | $D_4 = 0.0500$ | 1.7003 | 30.28 |
| $R_7 = +8.3333$ | | | |
| | $D_5 = 0.1800$ | 1.6968 | 55.61 |
| $R_8 = -0.4895$ | | | |
| | $S_3 = 0.0030$ | | |
| $R_9 = -2.4876$ | | | |
| | $D_6 = 0.0900$ | 1.6510 | 58.60 |
| $R_{10} = -0.6812$ | | | |
| | $S_4 = 0.0030$ | | |
| $R_{11} = +1.4085$ | | | |
| | $D_7 = 0.0900$ | 1.6510 | 58.60 |
| $R_{12} = -3.3557$ | | | | where $R_1, R_2 \ldots$ represent the radii of curvature of the individual surfaces, $D_1, D_2 \ldots$ represent the axial thicknesses of the elements, and $S_1, S_2 \ldots$ represent the axial air separations between components.

References Cited in the file of this patent

UNITED STATES PATENTS

| 2,687,063 | Coleman | Aug. 24, 1954 |
| 2,895,379 | Cook et al. | July 21, 1959 |

FOREIGN PATENTS

| 647,830 | Germany | July 14, 1937 |
| 804,143 | France | July 27, 1936 |